Figure 1:
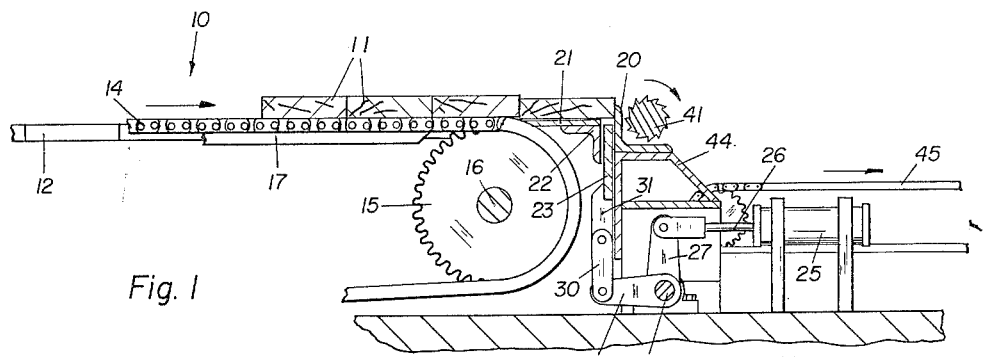

INVENTOR.
BURTON T. RANDALL
BY
Buckhorn, Cheatham & Blore
ATTORNEYS

United States Patent Office 3,071,235
Patented Jan. 1, 1963

3,071,235
LUMBER SEPARATOR AND FEEDER
Burton T. Randall, Roseburg, Oreg., assignor to C. & D. Lumber Co., Riddle, Oreg., a partnership
Filed May 22, 1961, Ser. No. 111,578
9 Claims. (Cl. 198—24)

The present invention comprises a lumber separator and feeder which is designed to advance boards in a transverse direction. The principal object of the present invention is to provide means whereby boards which are being transferred from one mechanism to another in a lumber mill, furniture factory or the like are caused to arrive at the second mechanism in a regulated, evenly spaced flow. For example, rough boards which are produced by a bandmill at irregular intervals may be caused by means of the present inventoin to arrive at an edger, trimmer or planer at regularly spaced intervals, thus giving the operator of the second mechanism time to inspect the boards and appropriately set the operating mechanism which he controls. The foregoing example is illustrative only, and numerous other uses of the invention will be readily apparent to those skilled in the art.

A further object of the present invention is to provide means of the foregoing character which may be operated automatically to advance boards in timed relation to each other, or manually to advance boards at the desire of an operator.

Another object of the present invention is to provide means of the foregoing character which will permit the accumulation of a supply of boards in ready availability for advancement to an operating mechanism, the foremost of which will be positively advanced when it is desired.

The objects and advantages of the present invention will be more readily apparent from inspection of the following specification taken in connection with the accompanying drawings wherein like numerals refer to like parts throughout, and in which a preferred form of the invention is described and illustrated.

Figure 2:
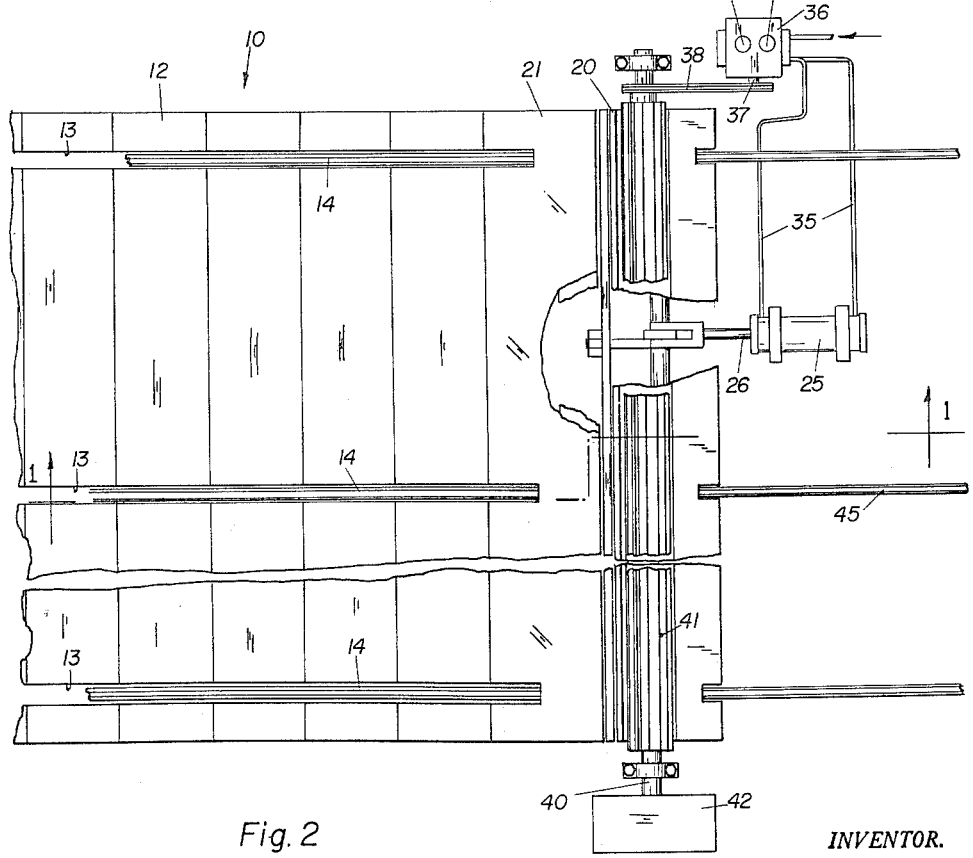

In the drawings,

FIG. 1 is a vertical section taken substantially along line 1—1 of FIG. 2 and showing a preferred form of the invention; and FIG. 2 is a plan view of FIG. 1, partly broken away, and partly schematic, showing the invention.

The invention comprises a lumber separator and feeder including a conveyor deck generally indicated at 10, upon which boards 11 may be accumulated in a single layer with the boards in edge-to-edge contact with each other. The conveyor deck comprises a fixed deck 12 mounted upon a suitable frame (not shown) in which there are a plurality of longitudinal slots 13 in which are positioned flexible endless conveyor means, preferably of the link type 14 herein illustrated. The conveyor means are trained about a plurality of sprockets 15 mounted upon a common shaft 16 adjacent one edge of the conveyor deck, and the upper flights thereof are supported upon guide rails 17 in the usual manner, so that their upper surfaces are maintained slightly above the level of the deck. The upper flights move the boards toward an edge of the conveyor deck in the direction of the arrow in FIG. 1, frictionally engaging the lower surfaces of the boards whereby to urge them into edge-to-edge contact throughout. Thus boards which may be angularly disposed irregularly across the deck when they are positioned thereon are caused to move toward an edge of the deck and align themselves with each other in edge-to-edge contact throughout, being thereafter constantly frictionally urged toward said edge while the conveyor means slips beneath them.

The foremost board engages a fixed abutment bar 20 adjacent said edge of the conveyor deck which projects above the level of the deck sufficiently to engage the foremost board and prevent movement thereof, the height of projection being in the order of one-quarter to one-half inch. The deck 12 comprises a plate 21 supported upon the frame, which at this point includes an angle bar 22 having a horizontal leg projecting rearwardly to support the plate 21 and a vertical leg extending downwardly. The forward edge of the plate 21 and the forward surface of the vertical leg of the angle bar 22, together with the rear surface of bar 20, define a slot in which there is mounted a vertically movable lifter bar 23. The abutment bar 20 and the lifter bar 23 preferably extend from lateral edge to lateral edge of the conveyor deck 12. The upper edge of the lifter bar 23 is normally maintained at or slightly below the level of the deck 12, so that the forward edge of the foremost board 11 is positioned above the lifter bar 23.

The lifter bar 23 may be elevated a short distance periodically or irregularly as desired, to position its upper edge at or above the level of the upper edge of the abutment bar 20. Any suitable means may be provided for this purpose, such as the double acting piston and cylinder device including the cylinder 25 and piston 26 associated therewith. The piston 26 is pivotally connected to a crank 27 fixed to a rockshaft 28 having a plurality of horizontally extending crank arms 29 affixed thereto. Each crank arm 29 is pivotally connected to a pair of vertically extending links 30, the upper ends of which are pivotally connected to lugs 31 fixed to and depending from the lifter bar 23. Upon movement of the piston 26 toward the right (FIG. 1), the lifter bar is elevated to raise the forward end of the foremost board above the abutment bar 20, whereupon the succeeding boards advance the foremost board across the abutment bar due to the frictional engagement of the succeeding boards with the conveyor means 14. A substantially instantaneous elevation of the lifter bar 23 is all that is required since the forward edge of the foremost board is instantaneously advanced across the abutment bar. The lifter bar is immediately lowered so as to be in position beneath the next oncoming board which is then arrested by the abutment bar.

As herein illustrated the piston and cylinder device is actuated by pressure fluid directed appropriately toward the opposite ends of the cylinder 25 through conduits 35 connected respectively to the opposite ends of the cylinder, and connecting the opposite ends of the cylinder to a control valve mechanism 36. The control valve mechanism includes a valve shaft 37 which is continuously rotated by means of the sprocket drive 38 suitably driven by a constantly moving portion of the conveyor mechanism. Conveniently the sprocket drive mechanism is driven from the shaft of a fluted, driven roll 41, which is rotated in the direction of the arrow in FIG. 1 at a relatively rapid speed compared to the speed of movement of the conveyor means 14. The shaft 40 is driven through a reduction gear mechanism 42 suitably connected to a source of power (not shown) and which may also be suitably connected to the shaft 16 of the conveyor means. The longitudinal flutes or teeth of the roll 41 are preferably sharply inclined in the forward direction and the upper edge of the roll is at or near the level of the upper edge of the abutment bar 20. Accordingly, the leading edge of a board being pushed across the abutment bar is first frictionally engaged by some of the teeth of the roll 41 to be rapidly moved forwardly. The trailing edge of the board is positively engaged by one of the teeth and the board given a positive shove in the forward direction thereby. The board drops along a ramp 44 and is picked up and moved forwardly by a second conveyor means comprising a plurality of parallel chains 45 so as to be advanced to a succeeding mechanism. In this instance the board is advanced laterally into some mechanism such as a trimmer which cuts off an end or the ends of the board. Any other second conveyor means may be utilized, such as a conveyor adapted to transport the board longitudinally into an edger or planer.

When the sprocket drive means 38 is employed, it will be obvious that the piston 26 is periodically reciprocated to advance the boards at definitely spaced intervals. However, the control device 36 may be provided with a manual by-pass valve 46 which, when actuated, would render the sprocket drive 38 ineffective. The control device 36 is also provided with a manual control valve 47 which may thereupon be actuated manually to advance the boards as desired. With such a manual device the lifter bar 23 may be quickly returned to its lower position after each raising thereof, or may remain in elevated position to arrest the succeeding board. Upon manual lowering thereof the lifter bar would permit limited further advance of the board until it engaged the abutment bar 20 and a successive elevation of the lifter bar would then cause advance of the board to the second conveyor.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A lumber separator and feeder comprising a conveyor deck upon which boards may be accumulated side by side in a single layer with the boards in edge-to-edge contact with each other, said conveyor deck comprising a stationary deck and flexible endless conveyor means projecting slightly above the level of said deck and moving in a direction transversely of the length of the boards toward an edge of the deck, said conveyor means frictionally engaging the lower surfaces of the boards to advance them toward said edge, abutment means beyond said conveyor means in the direction of advance of the boards and engaging the forward edge of the foremost board in said layer to arrest the boards while said conveyor means continuously moves beneath them, a lifter normally positioned beneath the level of said deck adjacent said abutment means at the side thereof facing said conveyor means so as to underlie the forward portion of the foremost board in said layer, and means for momentarily raising said lifter to such an extent that the leading edge of said foremost board is lifted above said abutment means whereby said foremost board is advanced across said abutment means by the thrust of succeeding boards engaged by said conveyor means.

2. A lumber separator and feeder comprising a conveyor deck upon which boards may be accumulated side by side in a single layer with the boards in edge-to-edge contact with each other, said conveyor deck comprising a stationary deck and flexible, endless, continuously moving conveyor means moving in a direction transversely of the length of the boards toward an edge of the deck, said conveyor means frictionally engaging the boards to advance them toward said edge, an abutment bar along said deck edge engaging the forward edge of the foremost board in said layer to arrest the boards, a lifter normally positioned beneath the level of said deck adjacent said abutment bar at the side thereof facing said conveyor means so as to underlie the forward portion of the foremost board in said layer, and means for momentarily raising said lifter to such an extent that the leading edge of said foremost board is lifted above said abutment bar whereby said foremost board is advanced across said abutment means by the thrust of succeeding boards engaged by said conveyor means, said means for momentarily raising said lifter comprising a motor and control means therefor actuated by said endless conveyor means whereby said lifter is raised at definite time intervals.

3. A lumber separator and feeder comprising a fixed conveyor deck upon which boards may be accumulated side by side in a single layer with the boards in edge-to-edge contact with each other, said conveyor deck comprising a stationary deck and a plurality of endless chains having upper flights projecting slightly above the level of said deck and moving in a direction transversely of the length of the boards toward an edge of the deck, said chains being parallel to each other and spaced across said deck, common driving means for said chains, said upper flights frictionally engaging the lower surfaces of the boards to advance them toward said edge, an abutment bar extending above the level of said deck beyond said upper flights in the direction of advance of the boards and engaging the forward edge of the foremost board in said layer to arrest the boards while said upper flights continuously move beneath them, a lifter bar normally positioned beneath the level of said deck adjacent said abutment bar at the side thereof facing said deck so as to underlie the forward portion of the foremost board in said layer, means for momentarily raising said lifter bar to such an extent that the leading edge of said foremost board is lifted above said abutment bar whereby said foremost board is advanced across said abutment bar by the thrust of succeeding boards engaged by said upper flights, said means for momentarily raising said lifter bar comprising a motor and control means therefor driven by said common driving means for said chains whereby said lifter bar is actuated at definite time intervals, and a board advancing mechanism at the opposite side of said abutment means to advance the boards away from said conveyor deck.

4. A lumber separator and feeder comprising a fixed conveyor deck upon which boards may be accumulated side by side in a single layer with the boards in edge-to-edge contact with each other, said conveyor deck comprising a stationary deck and a plurality of endless flexible members moving in a direction transversely of the length of the boards and frictionally moving them toward an edge of the deck, said members being parallel to each other and spaced across said deck, common driving means for said members, an abutment bar extending above the level of said deck in the path of advance of the boards and engaging the forward edge of the foremost board in said layer to arrest the boards, a lifter bar normally positioned beneath the level of said deck adjacent said abutment bar at the side thereof facing said deck so as to underlie the forward portion of the foremost board in said layer, means for periodically raising said lifter bar to such an extent that the leading edge of said foremost board is lifted above said abutment bar whereby said foremost board is advanced across said abutment bar by the thrust of succeeding boards engaged by said members, and a board advancing mechanism at the opposite side of said abutment means to advance the boards away from said conveyor deck comprising a toothed, driven roll extending parallel to said abutment bar and adjacent thereto on the side away from said conveyor deck in position to engage a board being advanced across said abutment bar.

5. A lumber separator and feeder comprising a conveyor mechanism upon which boards may be accumulated side by side in a single layer with the boards in edge-to-edge contact with each other, said conveyor mechanism comprising board moving means adapted to frictionally engage and support said boards, an abutment bar in the direction of advance of the boards and engaging the forward edge of the foremost board in said layer to arrest the boards while said conveyor mechanism slips with respect thereto, a lifter bar normally positioned between the foremost board adjacent said abutment bar at the side thereof facing said conveyor mechanism, and means for momentarily raising said lifter bar to such an extent that the leading edge of said foremost board is lifted above said abutment bar whereby said foremost board is advanced across said abutment bar by the thrust of succeeding boards frictionally engaged by said conveyor mechanism.

6. In a lumber separator and feeder, means urging a plurality of boards edgewise along a predetermined path,
- a stop positioned in said path to engage the edge of the leading one of the boards,
- lifting means positioned under the front portion of said leading one of the boards,
- and drive means for moving the lifter means from a retracted position outside of said path into engagement with said leading one of the boards to move the board to a position in which the front edge of the board clears the stop so that the board travels past the stop,
- the drive means also serving to move the lifter means back to said retracted position.

7. In a lumber separator and feeder, stop means,
- means for urging a plurality of boards of a predetermined thickness one after another along a predetermined path to urge the leading board into engagement with the stop means,
- the stop means projecting upwardly into said path a distance substantially less than said predetermined thickness,
- lifter bar means movable back and forth between a retracted position out of said path and below the front portion of said leading board and an operative position projecting into said path to push said leading board to a tilted position in which the forward edge of said leading board is above and clears the stop means, whereby pressure of the boards behind said leading board pushes said leading board over the stop means,
- and means for driving the lifter bar means back and forth between the retracted and operative positions thereof.

8. In a lumber separator and feeder, a deck,
- a stop bar at one end of the deck and projecting above the deck,
- means for urging a plurality of boards edgewise along the deck so as to urge the foremost one of the boards against the stop bar,
- a lifter bar,
- means mounting the lifter bar between the deck and the stop bar for reciprocal movement between a retracted position in which the lifter bar is below the deck and under the front portion of said foremost one of the boards and an operative position in which the lifter bar supports said foremost one of the boards in a position in which the forward edge thereof clears the stop bar,
- and drive means for reciprocating the lifter bar between the retracted and operative positions thereof.

9. The lumber separator and feeder of claim 6 wherein there is provided automatic means for periodically actuating the drive means,
- and selectively operable means for overriding the automatic means nad manually actuating the drive means.

References Cited in the file of this patent

UNITED STATES PATENTS

| | | |
|---|---|---|
| 2,109,301 | Nakane | Feb. 22, 1938 |
| 2,498,989 | Erland | Feb. 28, 1950 |
| 2,679,919 | De Koning | June 1, 1954 |